March 21, 1939.    E. J. WITCHGER    2,151,255
SPRING NUT
Filed Jan. 3, 1939
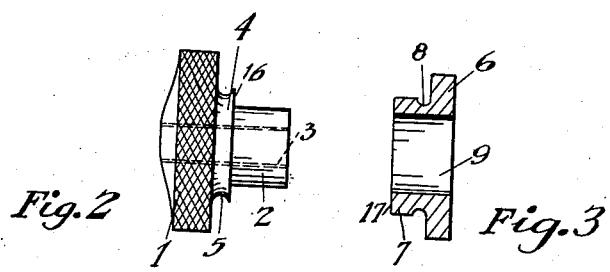
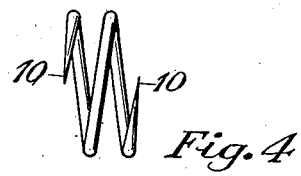
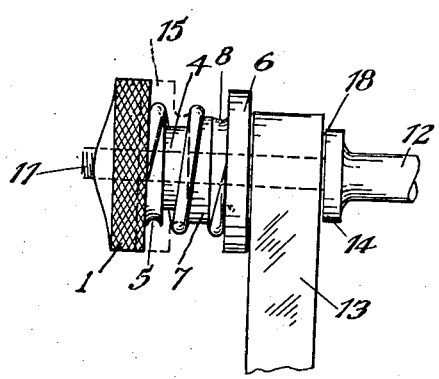
INVENTOR.
EUGENE J. WITCHGER
BY
ATTORNEY.

Patented Mar. 21, 1939

2,151,255

UNITED STATES PATENT OFFICE 2,151,255

SPRING NUT

Eugene J. Witchger, Saginaw, Mich., assignor to The Lufkin Rule Company, Saginaw, Mich., a corporation of Michigan Application January 3, 1939, Serial No. 249,039

3 Claims. (Cl. 85—32)

This invention relates to nuts for use on bolts and screws and relates more particularly to nuts that are capable of exerting yielding pressure when first screwed into contact with a work piece, and upon further screwing down will clamp the work piece unyieldingly, the same as a solid or unyieldable nut.

Nuts of the class referred to as yieldable are especially useful for fastening a pivoted joint composed of two or more members, as in toggle joints and the like, where it is desired to fasten the jointed members together so as to permit them to be moved angularly with relation to each other under different amounts of frictional resistance, or else to be clamped together rigidly in any adjusted position.

Heretofore such yieldable fastenings have usually consisted of a washer, a threaded nut and a spring interposed between the two, so that when the threaded member is screwed down to compress the spring the washer is pressed against the work piece by spring action. A disadvantage of such devices as usually designed was that the three members, that is, the threaded nut, the spring and the washer member when unscrewed would fall apart and sometimes cause much inconvenience. This was especially true in measuring instruments of various kinds wherein swinging arms are pivoted together by fastenings that clamp the pieces together by yieldable frictional engagement, or else rigidly, as circumstances require. If such devices comprised three separable and independent pieces the operator had difficulty in assembling the joints while he attempted at the same time to hold the instrument in its proper place and position.

My present improvement has to do with a novel co-operative arrangement and structure of the three usual elements, namely, the threaded nut element, the spring, and the washer or bearing element; which will be referred to as a spring nut.

The objects are to provide a simplified structure that will be compact, that is, of substantially as small size as an ordinary solid nut without the yieldable feature, yet will be capable of exerting adequate yielding pressure against the work piece when partly screwed down; the amount of such pressure varying according to the amount of compression given to the spring.

Another object is to provide in such a device a simplified abutment arrangement whereby the spring, after having been compressed a predetermined amount, will permit the other parts, namely, the washer and the threaded member, to act like a solid piece and clamp both the washer and the nut tightly against the work piece without any further yielding effect.

Another and important object of my improvement is to so co-ordinate the three members that they can be quickly assembled by hand, the end portions of the spring having snap engagement with the threaded member and the washer member respectively, thereby combining the three parts into a single unit that will not fall apart if accidentally dropped, yet possesses all of the above mentioned advantages.

With the foregoing and certain other objects in view which will appear later in the specification, my invention comprises the devices described and claimed and the equivalents thereof.

In the drawing:

Fig. 1 is a side view of the spring nut embodying my invention in a preferred form, the nut being threaded on a spindle so as to clamp a bar member against a flange member on the spindle;

Fig. 2 is a side view of the threaded section of the device;

Fig. 3 is a sectional view of the washer member or bearing element; and

Fig. 4 is a side view of the spring member.

The parts shown in Figs. 2, 3, and 4 are shown disassembled, the complete assembly being shown in Fig. 1.

The threaded section comprises a head 1, preferably knurled and having a tubular shank 2 with an internal thread 3. Numeral 4 indicates a circular boss adjacent the head 1 having an annular channel 5 around its periphery.

The washer member, Fig. 3, has a work engaging flange 6 and a cylindrical boss 7 adjacent the flange and formed with an annular channel 8.

A bore 9 may be provided in the washer to receive the elongated shank 2 of the threaded member, telescopically, when the parts are assembled as shown in Fig. 1. A helical compression spring, Fig. 4, surrounds the boss 7 of the washer member and also the boss 4 of the threaded member. The outer faces of the end convolutions of the spring are preferably flat to present fair bearing surfaces 10, 10 against the flange 6 of the washer member and against the inner face of the knurled head 1 of the threaded member, respectively. The spring ends, being thus tapered or pointed, are preferably bent radially inward sufficiently to be received by snap action in the respective channels 5 and 8 of the nut and washer members, as is shown in Fig. 1.

The parts are assembled by pushing the spring endwise over the cylindrical boss 7 until an end 10 of the spring snaps into the annular channel 8, then inserting shank 2 of the threaded section into bore 9 of the washer, and pushing the parts together until the other tapered end of the spring snaps into channel 5 on the boss 4 of the threaded member.

The parts may be disassembled by forcibly pulling the threaded section and the washer section apart. Under all ordinary circumstances of use and handling the three parts will remain together integrally so that the device can be applied, just as an ordinary nut, to the threaded end 11 of a spindle or bolt 12. The bolt may be used to frictionally clamp two or more parts together; for example, a bar 13 and a flange 14, Fig. 1.

In Fig. 1 the dotted line at 15 shows the longitudinally shifted position of the knurled head 1 when it is screwed down tight, the spring having been compressed sufficiently to allow the end faces of the bosses 4 and 7 to come into contact. While these faces 16 and 17 are separated the joint 18 between the two work pieces 13 and 14 is kept compressed solely by the compressive strength of the spring, the amount of pressure depending upon the degree of compression of the spring. After the two end faces 16, 17 have come into contact, further tightening of the threaded section gives a positive clamping action between the work pieces, the same as with a solid nut.

The device may be unscrewed and removed from the threaded end 11 of the spindle and if it is accidentally dropped the parts can not come apart and scatter.

In case the work-engaging face of the flange 6 on the washer section is rough or from some other cause happens to bind on the face of bar 13 and hence does not turn freely thereon when the knurled head 1 is rotated, the spring will nevertheless permit the threaded section to be screwed down further or to be loosened, because the bearing ends 10, 10 of the spring in the channels 5 and 8 allow the threaded section and the washer section to be turned relatively to each other and relatively to the spring. However, the parts are kept from being accidentally separated in the lengthwise direction. The spring can not be deformed or bulged out of shape as would be the case if the ends of the spring were prevented from sliding in the annular channels 5 and 8.

By the means above described I have produced a yieldable nut that is simple and inexpensive to manufacture and is compact, neat in appearance and durable. It can be assembled easily and can be taken apart without the use of tools, yet will not come apart with ordinary handling or when accidentally dropped. During the earlier stages of tightening against a work piece any amount of compression within the range of the spring may be exerted against the work, and any desired further clamping force within the strength of the screw threads may be exerted without subjecting the spring to any additional strain. Therefore, this device may be safely subjected in use to as rough treatment as any ordinary solid nut, yet its yieldable properties will remain unimpaired for purposes of frictional adjustment against a work piece.

In the foregoing description of the preferred form the effect of the solid nut is produced when the faces 16, 17, Fig. 2, come into contact. However, my invention includes a modification of this arrangement wherein the length of the shank 2 of the head is slightly greater than the length of the bore 9 in the washer 6, so that the end of part 2 will correctly engage the face of the work 13, Fig. 1. In that event the direct or solid clamping effect is produced by head 1 instead of being produced as in the foregoing description, by the clamping action of head 1 exerted on the work piece through the flange 6. The modified form has been found to be advantageous in certain kinds of work.

Having thus described my invention, what I claim and desire to secure by Letters Patent is:

1. A spring nut comprising in combination an internally threaded section having a circular boss formed with an annular peripheral channel and having a tubular shank projecting axially from the boss, a washer member comprising a flange and a tubular boss engaging telescopically with said shank and being formed with a peripheral channel adjacent said flange, a helical spring enclosing said boss and shank, and connecting said internally threaded section and said washer member in normally extended relation, the ends of said spring being releasably engaged by snap action in said channels, the end convolutions of said spring being tapered and directed inwardly to effect such snap action.

2. A spring nut comprising in combination an internally threaded member having a circular boss with an annular peripheral channel, a washer member comprising a flange and a boss formed with a peripheral channel adjacent said flange, a helical spring connecting said members and having its ends formed to engage by snap action in said respective channels.

3. A spring nut comprising in combination an internally threaded section having a circular boss formed with an annular peripheral channel and having a tubular shank projecting axially from the boss, a washer member comprising a flange and a boss formed with a peripheral channel adjacent said flange, a helical spring enclosing said boss and connecting said section and washer members in normally extended relation, the ends of said spring being releasably engaged by snap action in said channels.

EUGENE J. WITCHGER.